Sept. 16, 1969  K. BUICK ET AL  3,466,853
AIR CLEANER FOR INTERNAL COMBUSTION ENGINES
Filed Dec. 6, 1967  2 Sheets-Sheet 1
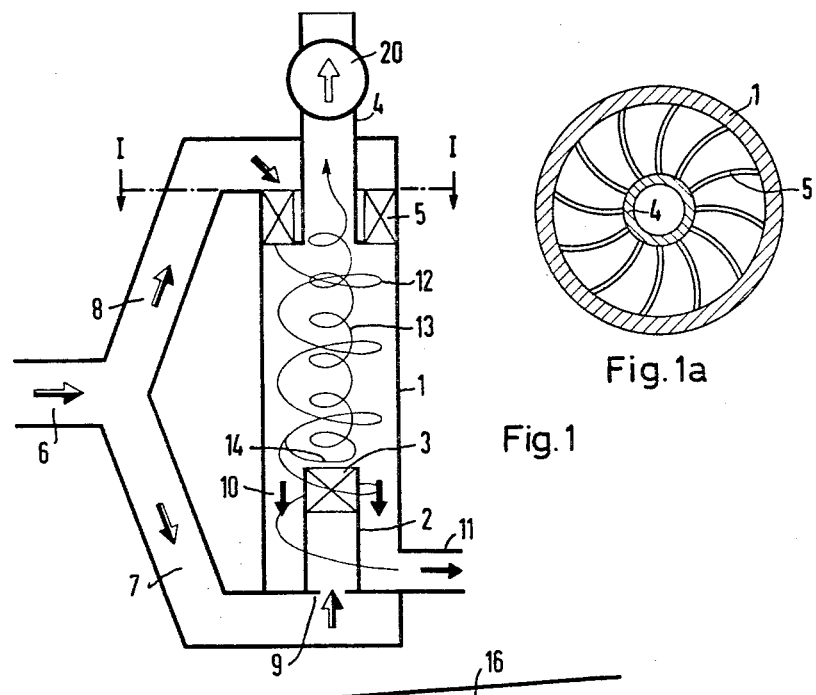
Fig. 1
Fig. 1a
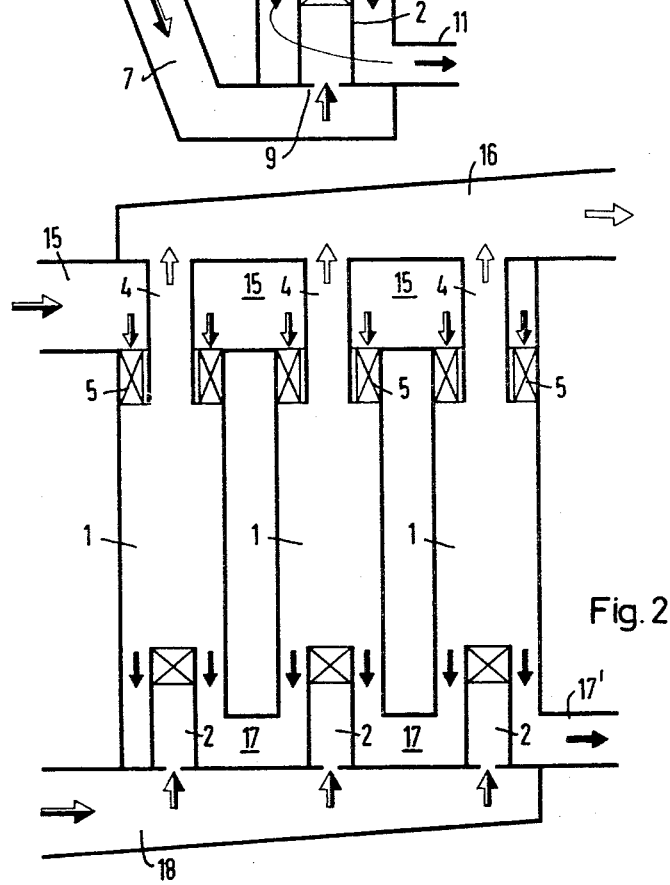
Fig. 2

United States Patent Office 3,466,853
Patented Sept. 16, 1969

3,466,853
AIR CLEANER FOR INTERNAL COMBUSTION ENGINES
Kurt Buick and Heinrich Klein, Erlangen, and Eduard Weber, Nuremberg, Germany, assignors to Siemens Aktiengesellschaft, a corporation of Germany
Filed Dec. 6, 1967, Ser. No. 688,606
Claims priority, application Germany, Jan. 7, 1967, S 107,771
Int. Cl. B01d 45/12
U.S. Cl. 55—1                                     6 Claims

ABSTRACT OF THE DISCLOSURE

An air cleaner for internal combustion engines divides the incoming raw air into two portions. A first portion is throttled relative to the other and is given a twisting motion while being passed axially and centrally into one end of cylindrical tornado-flow vessel. The second partial air-flow is passed directly into the other end of the tornado-flow vessel at localities radially spaced from the vessel center axis and through a ring of vanes which guide the second flow in directions generally tangential and inclined toward the first partial flow. The second partial air flow thus excites in the vessel a circulating tornado flow with a vortex sink and a vortex source with the effect of eliminating particulate material from the air leaving the vessel.

---

Our invention relates to a method and means for cleaning the combustion air of internal combustion engines. In a more particular aspect, the invention concerns the utilization for air-cleaning purposes of the tornado-flow principle requiring the use of a vessel in which a dust-separating action is performed with the aid of a circulating flow composed of an outer potential flow and an inner rotational or vortex flow, this principle and various devices for its realization in practice being known from U.S. Patents No. 3,199,268, No. 3,199,269 and No. 3,266,165.

As is more fully explained in these patents, a tornado flow comprises an outer potential flow which progresses substantially along helical paths near the inner wall of a cylindrical vessel or conduit and merges with an inner rotational or vortex flow which is located centrally and co-axially within the helical outer flow and advances in an axial direction opposed to the corresponding direction of the potential flow. The inner, rotational or vortex flow may be roughly compared with the vortex filament occurring in a wind hose or at the drain of a bath tub, and the outer potential flow merges with the inner vortex flow at axially spaced locations constituting a vortex sink and a vortex source respectively, thus providing in the vessel for a resultant circulatory flow which permits maintaining the just-mentioned flow conditions for any desired length of time and utilizing them for technological purposes.

When producing the circulating flow, briefly called tornado flow, in cylindrical vessels, the outer potential flow can be excited by means of injection nozzles acting through the peripheral wall or jacket of the tornado-flow vessel in a direction of injection generally tangential and inclined toward the axial component of the advancing direction of the inner, rotational flow. The raw gas to be cleaned is generally supplied to the tornado-flow vessel in an axial direction and then forms the inner, rotational or vortex flow of the circulating flow being produced and maintained. Any particles contained in the raw gas are then flung out of the rotational flow in the outward direction and entrained by a branch of the outer potential flow to be carried into a collecting bin or bunker.

When attempting to employ such a tornado-flow apparatus for the cleaning of combustion air for internal combustion engines, considerable difficulties are encountered. In the first place, the air inducted for combustion in an engine generally contains only slight amounts of impurities usually as suspended particles of a size within the range of about 1 to 10 microns or, in the event of intensive whirling or stirring, up to about 50 microns. The separation of the very fine particles (1 to 10 microns) makes it necessary to excit the tornado flow much more intensively than needed for the separation of coarser particles. For that reason it is preferable for the separation of such very fine particles to give the individual separator vessels an only small diameter. Besides, mounting such an air cleaner in an automotive vehicle or aircraft also demands a highly compact construction because of space limitations. However, when exciting the tornado flow with the aid of inclined-tangential nozzles in the jack of the separator vessel and blowing clean air by means of a fan through the nozzles, the parallel connection of several of such small separator vessels required for internal combustion engines, results in excessively large total space requirements, aside from the fact that the correspondingly small injection nozzles cause an increased pressure loss which in turn also requires increasing the rating of the air delivery fan or compressor.

It is a general object of our invention to minimize or obviate these difficulties involved in the application of tornado-flow air cleaners to internal combustion engines, particularly those used on vehicles.

Another more specific object of the invention is to provide an air cleaner for internal combustion engines which secures a compact design of small dimensions conjointly with a simple design and high operational reliability as well as a high degree of efficiency.

Another conjoint object of the invention is to afford with such an air cleaner a reliable operation with the just-mentioned other advantages even under greatly varying throughput quantities as occur particularly with internal combustion engines for automotive vehicles.

To achieve these objects and in accordance with a feature of our invention we divide the combustion air to be cleaned into two portions, before supplying the air to one or to a number of parallel connected tornado-flow separators. We then subject a first one of the partial flow portions to throttling and impart to the throttled flow a twisting motion about its flow axis while passing this first partial flow axially and centrally into one or more tornado-flow vessels. The second partial air flow, however, we pass directly into the vessel (or vessels) at localities radially spaced from vessel center axis; and as the second flow enters into each vessel, we guide the flow in directions generally tangential and inclined toward axial direction of the first partial flow.

An air cleaner for performing this method comprises a cylindrical vessel which forms tornado-flow chamber proper and has an axial supply conduit for the raw gas at one end and an outlet duct for the clean gas at the axially opposite end. The cylindrical vessel is further provided with a ring of guide vanes concentrically surrounding the clean-gas outlet conduit within the vessel. The individual guide vanes are spatially curved for avoiding the occurrence of shocks when deflecting the second air flow from its entering direction to that of the helical flow path in the interior of the vessel. The tornado-flow vessel is further equipped with an annular gap concentrically around the inlet conduit for the clean gas in the interior of the vessel and serves to catch the separated dust particles which are to be discharged from the annular gap.

In a parallel connection of several tornado-flow devices according to the invention, the second partial air flow is preferably supplied to the individual tornado-flow devices from a single plenum chamber through the respective rings of guide vanes, and the outlet conduits for the clean gas open into another plenum chamber common to all of the devices. For reliably discharging the separated particulate material, it is preferable to provide all of the parallel connected devices with a single bin or bunker in which, if desired, a slight suction pressure may be maintained in order to reliably secure the required difference in pressure. The supply of raw gas to all of the parallel connected devices may likewise be effected from a plenum chamber from which the individual clean-gas conduits issue to the respective devices.

The invention will be further described with reference to embodiments of air cleaners according to the invention illustrated by way of example on the accompanying drawings in which:

FIG. 1 shows schematically an axial section of an air cleaner comprising a single tornado-flow cell; and FIG. 1a is a cross-sectional view along the line I—I in FIG. 1.

FIG. 2 is a schematically sectional diagram of an air cleaner composed of several tornado-flow cells in hydraulic parallel relation.

Figure 3:
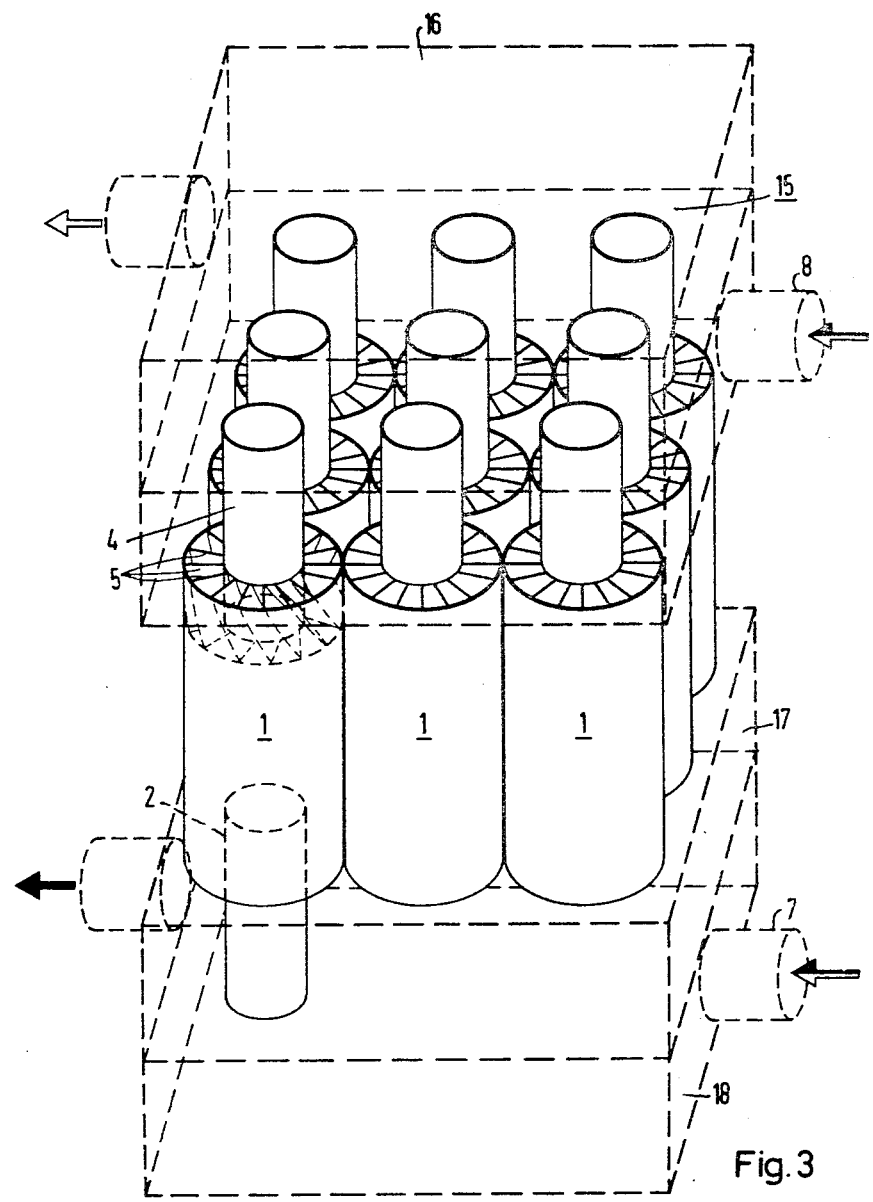
FIG. 3 is a schematically perspective view of another multi-cell air cleaner.

The single-cell tornado-flow device of FIG. 1 comprises an elongated cylindrical vessel 1 with an axially and centrally located inlet duct 2 for raw air protruding somewhat into the interior of the tubular vessel, so as to form therewith an annular gap space 10 at the bottom of the tornado-flow chamber. The inlet duct 2 is provided with guide vanes 3 which impart a pretwist to the incoming raw air. The vessel 1 further has a likewise axially and centrally extending outlet duct 4 for clean air which likewise protrudes some distance into the interior of the vessel 1 to provide an annular space in which a ring-shaped arrangement of guide vanes 5 is mounted. The vanes 5 are spatially curved in accordance with partial surfaces of a helix so that the partial air flow entering into the ring of guide vanes in directions parallel to the vessel axis is gradually deflected so as to receive a twist without abrupt or similar shock effects, thus causing the secondary air to flow into the vessel along its inner peripheral wall surface along helical paths in accordance with the desired potential flow. The air inducted from the ambient atomsphere enters through an inlet duct 5 and is divided to pass through two branch conduits 7 and 8 to the inlet duct 2 and to the entrance of the vane ring respectively.

During operation, the secondary air entering through the ring of guide vanes 5 produces in the interior of the tornado-flow vessel 1 a potential flow 12 along the above-mentioned helical paths in the vincinity of the peripheral vessel wall. At some distance above the opening of the inlet duct 2 this potential flow moves partly in the inward direction through a vortex sink 14 in which the other potential flow merges with the incoming raw air so as to form a rotational (vortex) flow 13 comparable to a vortex filament which ascends on relatively narrow helical paths in the upward direction. In the lower region of the rotational flow 13 and above the opening of the inlet duct 2 there is formed a vortex source in which the particles entrained by the entering raw air are flung outwardly in the direction toward the wall of the vessel 1 and are entrained by a branch of the potential flow 12 into the annular collecting space 10 from which they are drained through an outlet 11 into a bin.

An adjustable throttle diaphragm 9 mounted in the inlet duct 2 or another locality of the branch conduit for the raw portion of the air permits adjusting and securing the required pressure difference between the secondary air entering from above through the ring of guide vanes 5 on the one hand and the raw air entering from below through the inlet ducts 2.

If desired, a suction blower may be connected with the clean-gas outlet conduit, such as the blower shown at 20 in FIG. 1, in order to produce the required flow of air through the inlet duct 6 and the branch conduits 6, 7. However, in many cases the suction pressure produced by the internal combustion is sufficient for obtaining the pressure difference required for maintenance of the air flow through the air cleaner.

FIG. 2 shows three tornado-flow vessels 1 in hydraulic parallel connection. The raw gas enters into the inlet ducts 2 of the respective vessels from a plenum chamber 18. The secondary air enters into the respective vane rings 5 of the vessels 1 from another plenum chamber which all of the tornado devices have in common. The clean gas passes through the respective outlet ducts into a plenum chamber 16 also appertaining to all of the parallel devices. From plenum chamber 16 the clean air is supplied to the internal combustion engine or the carburator.

The separated particles are collected in a bin 17 which communicates with the respective annular collector spaces of the separator vessels 1. The accumulated dust is discharged through an outlet duct 17'. For maintaining a defined pressure difference between the tornado-flow chambers and the bin 17 to thus prevent a return flow of dust particles from the bin into the chambers, the bin may be kept under slight suction pressure, for example by connecting it with the exhaust conduit of the engine.

It will be understood from the above-described embodiments that according to the invention the combustion air to be cleaned is employed as the raw gas of the tornado-flow separator as well as for the secondary air needed for exciting the tornado-flow in the separator. Due to the fact that the branched-off secondary air for exciting the tornado-flow is supplied with the aid of a ring of guide vanes concentrically surrounding the clean-gas outlet conduit, the vessel jacket need not be provided with inclined-tangential nozzles. Consequently when connecting several tornado vessels in parallel with each other, these vessels can be mounted directly and closely beside each other. This permits a saving of space up to 70% in comparison with conventional tornado-flow devices. Such further, by virtue of the invention, a suction blower may be arranged in the clean-gas conduit, or the suction pressure of the internal combustion engine itself may be sufficient, and since the raw gas flow entering into a tornado-flow chamber is throttled before entering, no further suction or pressure blowers are necessary. Furthermore, a deterioration or wear of the blowers by unclean air is prevented. The pressure difference required for producing the circulating (tornado) flow between the entering raw gas and the secondary air flowing in a direction opposed to that of the raw gas is secured and maintained exclusively by the adjustable throttling of the raw gas. Such throttling may be effected automatically in accordance with the particular or instantaneous requirements such as fluctuating throughput quantities or the like. The air-cleaning method and device according to the tornado-flow principle as applied by the present invention is thus particularly well suitable for applications involving greatly varying load conditions involving greatly fluctuating throughput quantities as well as most diverse pressure conditions.

The above-mentioned advantage of eliminating the need for interspaces between parallel connected separator cells is particularly well apparent from the embodiment shown in FIG. 3. This embodiment comprises a block of nine parallel connected tornado-flow vessels 1, each comprising the ducts and vane rings described above with reference to FIGS. 1 and 2. The structures that provide the above-mentioned plenum chambers 15, 16, 18 and the common bin 17 are shown by broken lines to prevent obscuring the arrangement of the nine individual cells mounted in immediate proximity to each other. This illustration particularly shows the compact construction of the air cleaner achieved by virtue of the fact that the secondary air for all of the individual cells is supplied from a common plenum chamber located on top of the cells so that no space is required laterally of the individual cells or between the cells.

It will be recognized that in this manner any desired larger or smaller number of individual tornado-flow cells can be connected in hydraulic parallel relation. Furthermore, the invention is not limited to the cleaning of combustion air for internal combustion engines but is also applicable for other gas-cleaning processes in which a high degree of cleaning is required conjointly with a particularly small over-all height, as is the case for example with engines for helicopter drives, building and earth-moving machinery and various mining machinery such as augers, drilling and hauling machines for use underground. The fraction of dust elimination obtainable with such tornado-flow devices obviates the subsequent use of conventional bag-type or oil filters, thus permitting further savings in power requirements and cost.

Since in tornado-flow cleaners as used in accordance with the invention, the separated particles are not flung onto the wall surface of the tornado-flow chamber but collect substantially in the boundary region between the rotational flow and the potential flow, such air cleaners also operate almost without mechanical wear. The cleaners are applicable not only for the separation of dry and solid particles but are suitable also for separating liquid or moist admixtures, such as oil sump mists and the like.

To those skilled in the art, it will be obvious upon a study of this disclosure that our invention permits various modifications with respect to details and uses of the air cleaners and hence may be given embodiments other than particularly illustrated and described herein, without departing from the essential features of the invention.

We claim:
1. The method of cleaning combustion air for internal combustion engines with the aid of tornado-flow vessel means, which comprises dividing a flow of combustion air into two portions, throttling a first one of the two partial air flows and imparting thereto a twisting motion about its flow axis while passing said first partial flow axially and centrally into the tornado-flow vessel means substantially at one end thereof; and passing the second partial air flow into the vessel means at substantially the other end thereof at localities radially spaced from the vessel center axis while guiding said second partial flow at its vessel entering locations in directions generally tangential and inclined to the axial direction of said first partial flow.

2. An air cleaner for internal combustion engines, comprising a tornado-flow vessel having a cylindrical chamber; a raw-air inlet duct coaxially protruding into said vessel at one end thereof and forming therewith an annular gap space concentrically surrounding said inlet duct for collecting separated particle material, a clean-gas outlet duct of smaller diameter extending coaxially into said vessel at the other end thereof forming there with a second annular space, a ring group of guide vanes in said second annular space concentrically surrounding said outlet duct and having peripherally distributed vanes of curved and generally helical shape for shockfree introduction of secondary air on helical paths directed in opposition to the raw-gas entering direction; air supply means having two conduit branches connected to and communicating with said inlet duct and with said cylindrical chamber at said second annular space upstream of said vane group respectively for dividing the incoming air into a first flow of raw air through said inlet duct and a flow of secondary air through said vane group, and throttle means in one of said conduit branches.

3. In an air cleaner according to claim 2, said two conduit branches having an air inlet in common.

4. In an air cleaner according to claim 2, said throttle means being located in said conduit branch communicating with said raw-air inlet duct.

5. In an air cleaner according to claim 2, said air supply means comprising a suction blower connected to said clean gas outlet duct.

6. An air cleaner for internal combustion engines comprising several tornado-flow vessels according to claim 2 connected in parallel relation and mounted directly adjacent to each other with the respective vessel axes in parallel and all of said clean-gas outlet ducts on top, first plenum-chamber means disposed above said vessels and communicating with said vane groups of all of said vessels, said first plenum-chamber means forming part of one of said conduit branches, second plenum-chamber means disposed above said vessels and communicating with all of said clean-gas outlet ducts, a bin located beneath said vessels and communicating with all of said annular gap spaces for collecting the particle material separated in all of said vessels, and a third plenum chamber means communicating with all of said inlet ducts and forming part of said other conduit branch.

References Cited

UNITED STATES PATENTS

| | | | |
|---|---|---|---|
| 1,717,639 | 6/1929 | Waters | 55—261 |
| 2,069,483 | 2/1937 | Skajaa | 55—348 |
| 2,494,465 | 1/1950 | Watson et al. | 55—261 |
| 2,638,219 | 5/1953 | Gordon et al. | 209—144 |
| 2,756,878 | 7/1956 | Herkenhoff | 209—211 |
| 2,804,171 | 8/1957 | Yellott et al. | 55—348 |
| 2,911,066 | 11/1959 | Neely | 55—459 |
| 2,963,109 | 12/1960 | Brookman et al. | 55—261 |
| 3,165,390 | 1/1965 | Parken et al. | 55—431 |
| 3,199,269 | 8/1965 | Oehlrich et al. | 55—261 |
| 3,199,270 | 8/1965 | Oehlrich et al. | 55—261 |
| 3,232,430 | 2/1966 | Saint Jacques | 55—261 |
| 3,266,165 | 8/1966 | Apostle et al. | 34—28 |
| 3,358,844 | 12/1967 | Klein et al. | 209—144 |

FOREIGN PATENTS

| | | |
|---|---|---|
| 933,936 | 8/1963 | Great Britain. |

HARRY B. THORNTON, Primary Examiner.

B. NOZICK, Assistant Examiner.

U.S. Cl. X.R.

55—348; 449, 456, 458, 467; 209—144